PUSH-PULL TRANSISTOR INVERTER
Filed May 24, 1960
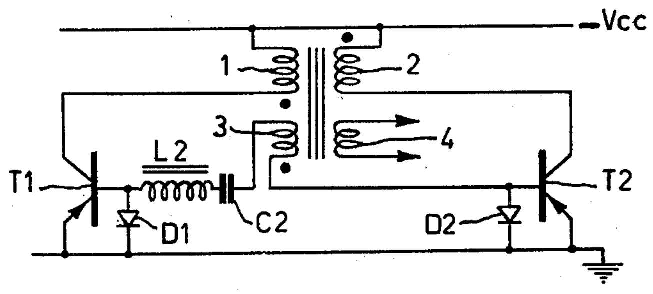
INVENTOR
A. F. NEWELL
W. L. STEPHENSON
BY
AGENT 3,098,202
Patented July 16, 1963

3,098,202
PUSH-PULL TRANSISTOR INVERTER

Allen Frederick Newell, Southampton, and William Lawrence Stephenson, Horley, England, assignors to North American Philips Company, Inc., New York, N.Y., a corporation of Delaware Filed May 24, 1960, Ser. No. 31,291
Claims priority, application Great Britain June 29, 1959
4 Claims. (Cl. 331—114)

This invention relates to push-pull transistor inverters.

In known push-pull transistor inverter arrangements there is the problem of determining the timing with which switching is effected from one transistor to the other. In conventional circuits, which frequently employ a saturating core, the conducting transistor is in the bottomed condition and constant base drive is applied thereto until the transistor reaches its maximum available collector current, i.e., the collector current ($Ic$) reaches the value $Ic=\alpha' Ib$ (where $Ib$ is the base current). Since the collector current cannot rise further, the transistor is forced out of the bottomed condition and this initiates the switch-over action.

These methods present a number of well-known disadvantages. The main disadvantage is that if a circuit is designed to cope with spreads in transistor characteristics (e.g., $\alpha'$) due to unavoidable lack of uniformity in manufacture, then the maximum available collector current with the best transistors may be several times greater than the useful collector current supplied to the load. This means that it is only possible to make use of a fraction of the power handling capability of the transistor.

It is an object of the present invention to provide improved inverter circuit arrangements which permit the above disadvantages to be overcome.

According to the present invention a push-pull transistor inverter or square-wave generator circuit arrangement comprises in combination a pair of transistors, a transformer having a core together with a pair of collector windings connected respectively in series in the collector circuits of said transistors, a feedback winding on said core which winding is connected to the base electrodes of both transistors through a feedback loop which includes both of said base electrodes, and time determining components constituted by a capacitance and an inductance connected in series between said base electrodes in said feedback loop for the purpose of controlling the timing of the operation of the arrangement, the arrangement being such that said core does not saturate during operation. With such an arrangement the timing function is performed in the base circuits of the transistors and therefore there is no need to pass currents at high peak levels when the load is small. This principle is known per se, but it is applied in the present invention in a particularly effective and convenient manner.

Since a circuit arrangement according to the invention generates a square-wave, the arrangement is suitable for use as part of a D.C. converter wherein a square-wave output is rectified to provide a D.C. supply.

The time determining inductance and capacitance preferably have such values as to enable them to operate as a series tuned circuit. This arrangement enables very accurate control of the frequency of operation and is particularly useful in applications in which the frequency of operation is important, for example, when the inverter forms part of a D.C. converter used to supply equipment operating at a predetermined frequency in such manner as to be liable to interference by frequencies generated in the converter. The control of the converter frequency will be maintained by the tuned circuit regardless of changes in applied voltage and load value.

Specific embodiments of the invention will now be described by way of example with reference to the accompanying diagrammatic drawing as applied to p-n-p junction transistors.

The drawing shows an arrangement in which the time determining components are an inductance L2 and a capacitance C2 forming a series tuned circuit.

The circuit employs a pair of transistors T1—T2 and a transformer having collector windings 1, 2 connected to a supply $-Vcc$ and a feedback winding 3 within a base feedback loop. In addition, there is a transformer output winding 4 for providing a square-wave output which may, if desired, be rectified to provide D.C. converter action.

Diodes D1 and D2 provide the return path for the base currents of T2 and T1 respectively so that there is always a low-impedance path between emitter and base even when a transistor is cut off. The switch-over occurs when the capacitor has charged up sufficiently to reduce the base current to $Ic/\alpha'$. At this time the transistor comes out of its bottomed condition and regenerative switch-over occurs.

The diodes D1—D2 are used in preference to resistances so as to permit the tuned circuit to have a higher "Q" value. The feedback winding of the transformer has very little effect on the frequency since it can be considered as a voltage generator. In practice, of course, there will be a small leakage inductance, but for a well designed transformer this should be negligible compared with the tuning inductance L2.

The operation will be described in greater detail as follows.

It will be assumed at first that transistor T2 is turning on to the bottomed condition. In these circumstances substantially the whole of the D.C. supply voltage ($Vcc$) is applied suddenly across collector winding 2. At the same time there is induced on winding 3 a smaller voltage V3. This feedback voltage (V3) is applied via inductance L2 and capacitance C2 to the base-emitter section of transistor T2 with such polarity as to cause forward bias current in transistor T2 (thus rendering transistor T2 even more conductive) while applying a small positive voltage across diode D1 so as to provide reverse bias current in transistor T1. Thus the turning on of transistor T2 is effected in a cumulative manner while transistor T1 is being cut off.

Once transistor T2 reaches its bottomed condition its base current ($Ib2$) has an initial value which then decays owing to the presence of the capacitance C2. At a certain point this decay starts to take transistor T2 out of its bottomed condition. As a result, the voltage across winding 2 begins to decrease, and consequently the voltage V3 induced in winding 3 also decreases. As a further consequence, the base current $Ib2$ of transistor T2 is reduced more rapidly and this leads to transistor T2 being cut off in a cumulative manner.

At this point, transistor T1 starts to conduct because the feedback voltage V3 has decayed towards zero thus releasing the charge previously accumulated in capacitance C2. The capacitance begins to discharge and thus provides a rising forward bias current ($Ib1$) for the transistor T1. (At this stage, diode D1 is cut off while diode D2 begins to conduct.) This in turn allows transistor T1 to be turned On by a cumulative process as described above in relation to transistor T2.

A set of suitable values and components will now be given by way of illustration as applied to the circuit of the drawing:

*Table*

Transformer core=two E-shaped ferrite cores (Mullard type FX1819) joined without air gap
Collector windings (1 and 2)=wound together in bifilar manner, each having 100 turns of 22 SWG wire
Feedback winding 3=10 turns of 33 SWG wire.
Transistors=Mullard type 0023 high frequency power transistors.
Diodes=Mullard type OA10.
Collector supply voltage $-Vcc$=12 volts.
Capacitor C2=2 $\mu$f.
Inductance L2=80 turns wound on a core constituted by two E-shaped ferrite cores (Mullard type FX1238) assembled with 10-thou. gaps between pairs of corresponding limbs In the absence of ancillary starting means, the circuits of the drawing (like most inverter circuits) is not suitable for self-starting under load since there is no forward bias until oscillations have begun. This can easily be remedied by inserting a resistance between each base and the collector supply rail so as to provide a degree of initial forward bias current. Assuming that the values of the table are used, each of said resistances may have a value of 4.7K.

What is claimed is:

1. A push-pull transistor inverter or square-wave generator circuit arrangement comprising: a pair of transistors each having a collector-, a base- and an emitter-electrode, a source of D.C. potential having two terminals, a transformer having a core, a pair of collector windings arranged on said core, said windings being connected in series with said source of potential in the collector-emitter circuits of said transistors, respectively, a feedback winding on said core, said feedback winding being connected in series with a capacitor and an inductor between the respective base electrodes of said transistors, said feedback winding, said capacitor and said inductor forming in combination a feedback loop determining the timing of the operation of the arrangement, said capacitor and said inductor having such values that said core does not saturate during operation.

2. A push-pull transistor inverter or square-wave generator circuit arrangement comprising: a pair of transistors each having a collector-, a base- and an emitter-electrode, a source of D.C. potential having two terminals, a transformer having a core, a pair of collector windings arranged on said core, said windings being connected in series with said source of potential in the collector-emitter circuits of said transistors, respectively, a feedback winding on said core, said feedback winding being connected in series with a capacitor and an inductor between the respective base electrodes of said transistors, said capacitor and inductor having values such that they operate as a series tuned circuit, said feedback winding, said capacitor and said inductor forming in combination a feedback loop determining the timing of the operation of the arrangement, said capacitor and said inductor having such values that said core does not saturate during operation.

3. A push-pull transistor inverter or square-wave generator circuit arrangement comprising: a pair of transistors each having a collector-, a base- and an emitter-electrode, a source of D.C. potential having two terminals, a transformer having a core, a pair of collector windings arranged on said core, said windings being connected in series with said source of potential in the collector-emitter circuits of said transistors, respectively, a feedback winding on said core, said feedback winding being connected in series with a capacitor and an inductor between the respective base electrodes of said transistors, a pair of diodes, each diode of said pair being connected between the base and emitter electrodes of a transistor in the forward direction, said feedback winding, said capacitor and said inductor forming in combination a feedback loop determining the timing of the operation of the arrangement, said capacitor and said inductor having such values that said core does not saturate during operation.

4. A push-pull transistor inverter or square-wave generator circuit arrangement comprising: a pair of transistors each having a collector-, a base- and an emitter-electrode, a source of D.C. potential having two terminals, a transformer having a core, a pair of collector windings arranged on said core, said windings being connected in series with said source of potential in the collector-emitter circuits of said transistors, respectively, a feedback winding on said core, said feedback winding being connected in series with a capacitor and an inductor between the respective base electrodes of said transistors, said capacitor and inductor having values such that they operate as a series tuned circuit, a pair of diodes, each diode of said pair being connected between the base and emitter electrodes of a transistor in the forward direction, said feedback winding, said capacitor and said inductor forming in combination a feedback loop determining the timing of the operation of the arrangement, said capacitor and said inductor having such values that said core does not saturate during operation.

References Cited in the file of this patent

UNITED STATES PATENTS

| | | |
|---|---|---|
| 2,927,281 | Vogt et al. | Mar. 1, 1960 |
| 2,962,667 | Relation et al. | Nov. 29, 1960 |
| 2,971,166 | Schultz | Feb. 7, 1961 |